(No Model.)
L. GUTMANN.
METHOD OF CHANGING FREQUENCY OF PERIODIC CURRENTS.
No. 566,076. Patented Aug. 18, 1896.
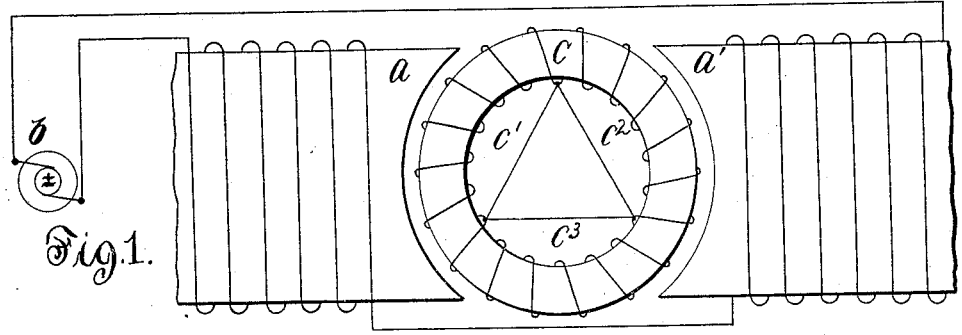
Fig. 1.
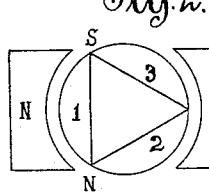
Fig. 2.
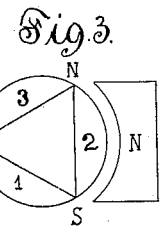
Fig. 3.
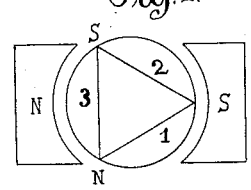
Fig. 4.
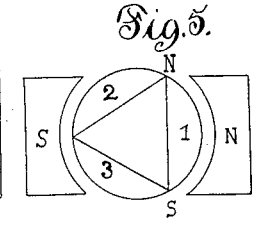
Fig. 5.
Fig. 6.
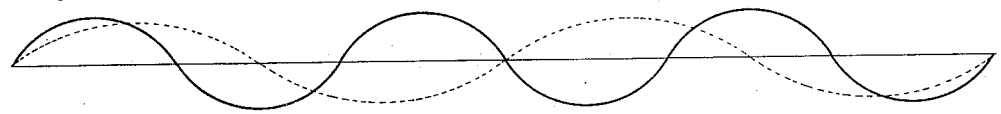
Fig. 7.
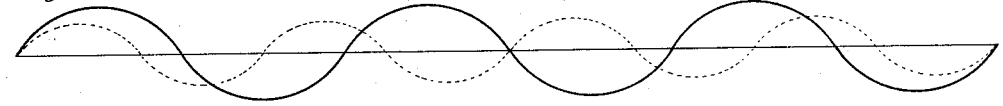
Fig. 8.
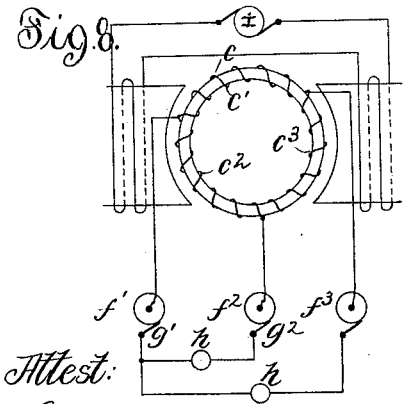
Fig. 9.
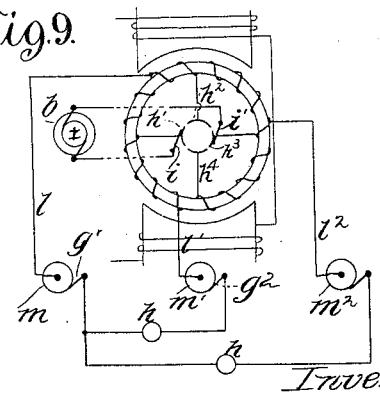
Attest:
George L. Cragg.
W. Clyde Jones.
Inventor:
Ludwig Gutmann.
By Barton & Brown
Attorneys.
THE NORRIS PETERS CO., PHOTO-LITHO., WASHINGTON, D. C.

UNITED STATES PATENT OFFICE.

LUDWIG GUTMANN, OF CHICAGO, ILLINOIS.

METHOD OF CHANGING FREQUENCY OF PERIODIC CURRENTS.

SPECIFICATION forming part of Letters Patent No. 566,076, dated August 18, 1896.

Application filed October 22, 1894. Serial No. 526,629. (No model.)

*To all whom it may concern:*

Be it known that I, LUDWIG GUTMANN, a subject of the German Emperor, residing at Chicago, in the county of Cook and State of Illinois, have invented a certain new and useful Method of Changing the Frequency of Periodic Currents, (Case No. 69,) of which the following is a full, clear, concise, and exact description, reference being had to the accompanying drawings, forming a part of this specification.

My invention relates to a method of changing the frequency of periodic currents; and its object is to provide means whereby a periodic current may be transmitted to the point of consumption and there changed in frequency to meet the particular requirements of the case at hand.

My invention consists, broadly, in transmitting the periodic current to be altered in frequency to the point of consumption and establishing thereby an alternating current of a period greater or less than the time-period of the original current.

In practicing my invention I establish, by means of the periodic current, a magnetic field, and rotate in the field thus produced a conductor or coil, so that the coil passes the poles of the field at a rate to induce therein a current having a different period from the original current. In the preferred form of my invention I provide a number of conductors or coils and pass a portion of the current thus produced through the external circuit, where the current of altered frequency is to be utilized, while the remaining current is passed through coils occupying different positions in the field to thereby maintain rotation.

I will describe my invention more particularly by reference to the accompanying drawings, in which—

Figure 1 is a diagrammatic view of a motor illustrative of my invention. Figs. 2, 3, 4, and 5 are diagrams illustrating the armature in four of the positions of its rotation. Figs. 6 and 7 are diagrams illustrating alternating-current curves. Fig. 8 is a diagram of the motor of Fig. 1 provided with collecting devices for taking off the currents of altered frequency. Fig. 9 is a diagram of a device for producing the altered currents conductively, the field being excited by either alternating or continuous currents.

Like letters refer to like parts throughout the different figures.

In Fig. 1 the field-magnets $a\ a'$ are excited by an alternating current from an alternating-current generator $b$, thus producing an alternating magnetic field. Within the field rotates an armature $c$, provided with coils $c'\ c^2\ c^3$, interconnected to form three subcircuits. If the armature be started, it will continue to rotate harmoniously, and the alternating current generated in any one of the three coils will have a frequency different from that of the current exciting the field. This will be understood by reference to Figs. 2, 3, 4, and 5.

In Fig. 2 the coil $l$ stands opposite a north pole, the pole to the left being of north polarity. At the end of a sixth revolution coil $l$ is advanced to the position shown in Fig. 3, the pole to the right being now of a north polarity, the field strength having changed through half of a complete period, or one hundred and eighty degrees. At the end of a third revolution coil $l$ has advanced to the position shown in Fig. 4, the pole to the left now being north, the field strength having changed through a complete period, or three hundred and sixty degrees. At the end of three-sixths of a revolution of the armature-coil $l$ stands again in front of a north pole, as shown in Fig. 5. The current induced in coil $l$ has therefore passed through one complete cycle or alternation, while the field strength inducing the current has passed through one and one-half cycles or alternations, the ratio therefore of the frequency of the current induced in coil $l$ to the frequency of the field, or, what is the same thing, the frequency of the current exciting the field, will be as one and a half to one, or as three to two, so that, if the frequency of the original current be sixty per second, the frequency of the induced current will be forty per second. If, instead of interconnecting the winding, as shown in Fig. 1, the ends of the coils $c'\ c^2\ c^3$ be connected with collecting-rings $f'\ f^2\ f^3$ and brushes be placed upon any two of the collecting-rings, an alternating current possessing the altered frequency may be collected, and a translating device $h$, connected in circuit between the brushes, as $g'\ g^2$, will be traversed by the current of altered frequency.

In Fig. 9 is illustrated another form of apparatus for producing the same result, comprising an armature, the coils of which are connected with the commutator-segments $h'$ $h^2$ $h^3$ $h^4$, upon which bear brushes $i$ $i'$, connected in circuit with an alternating-current generator $b$. Three equidistant points in the winding are connected by the conductors $l$ $l'$ $l^2$ with collecting-rings $m$ $m'$ $m^2$. If brushes be provided in connection with any two of the collecting-rings, an alternating current of altered frequency will be collected. Thus the translating device $h$, connected between the brushes $g'$ $g^2$, will be traversed by the alternating current of altered frequency.

In Fig. 6 the curve of the alternating current the phase of which is to be altered is shown in full lines, while the resultant current of two-thirds the frequency, as shown in connection with Figs. 2, 3, 4, and 5, is plotted in dotted lines.

In Fig. 7 is shown a similar curve, and a curve of greater frequency produced therefrom, the method being equally applicable to increasing or decreasing the frequency. As shown in Fig. 7, the frequency is increased in the ratio of three to four. It is evident that the resultant current may have a period equally divisible into the period of the current to be altered, that is, a period of one-half, one-third, &c., or it may have a period forming a multiple of the period of the current to be altered, as twice, three times, &c., or the periods may bear a harmonic relation, as three to two, four to three, &c. Thus if the relation be three to two the time of three complete cycles of the one equals the time of two complete cycles of the other, or if the relation be four to three the time of four cycles of the one equals the time of three cycles of the other.

When a conductor or coil occupies, at the end of each alternation of the field, the same position relatively to the poles of the field, the motor is said to be running synchronously. If, however, the conductor occupies the same position relatively to the field only after two, three, or more alternations of the field, or, if the coil rotates two, three, or more times while the field makes one alternation, I speak of the motor as running "harmoniously." Thus, as illustrated in Figs. 2, 3, 4, and 5, the coil $l$ at the end of a half-revolution occupies again the same position relatively to the field-poles, but, in the meantime, the field has made one and one-half alternations. The motor is, therefore, running harmoniously. Did the field at the end of a half-revolution also complete a half-alternation, the motor would be running synchronously.

Having thus described my invention, what I claim as new, and desire to secure by Letters Patent, is—

The method of altering the frequency of a periodic current and maintaining rotation of the movable element of the rotary transformer, which consists in creating a magnetic field by means of said current and rotating harmoniously in said field a number of conductors or coils so as to pass the poles of said field at a rate greater or less than but not coincident with the rate of the periodic current, passing a portion of the current from the coils through an external circuit, and passing the remainder of the current through coils occupying different positions in the magnetic field to maintain rotation.

In witness whereof I hereunto subscribe my name this 18th day of October, A. D. 1894.

LUDWIG GUTMANN.

Witnesses:
GEORGE L. CRAGG,
W. CLYDE JONES.